United States Patent
Tomas Puchades

(10) Patent No.: US 11,685,344 B2
(45) Date of Patent: Jun. 27, 2023

(54) SAFETY DEVICE FOR VEHICLE WASH TUNNEL AND METHOD OF OPERATION

(71) Applicant: ISTOBAL, S.A., La Alcudia (ES)

(72) Inventor: Yolanda Tomas Puchades, La Alcudia (ES)

(73) Assignee: ISTOBAL, S.A., Valencia (ES)

( * ) Notice: Subject to any disclaimer, the term of this patent is extended or adjusted under 35 U.S.C. 154(b) by 117 days.

(21) Appl. No.: 17/319,337

(22) Filed: May 13, 2021

(65) Prior Publication Data

US 2021/0354668 A1 Nov. 18, 2021

(30) Foreign Application Priority Data

May 14, 2020 (ES) ................................ ES202030447

(51) Int. Cl.
*B60S 3/04* (2006.01)

(52) U.S. Cl.
CPC ....................................... *B60S 3/04* (2013.01)

(58) Field of Classification Search
CPC .............. B60S 3/04; B60S 3/066; B60S 3/06
See application file for complete search history.

(56) References Cited

U.S. PATENT DOCUMENTS

| | | | | |
|---|---|---|---|---|
| 3,403,417 A * | 10/1968 | Hanna | ...................... | B60S 3/042 |
| | | | | 15/DIG. 2 |
| 3,501,794 A | 3/1970 | Solomon | | |
| 3,731,332 A * | 5/1973 | Bernardi | .................... | B60S 3/06 |
| | | | | 15/DIG. 2 |
| 3,795,929 A * | 3/1974 | Thompson | ................ | B60S 3/06 |
| | | | | 15/53.2 |
| 3,798,696 A * | 3/1974 | Cirino | ........................ | B60S 3/06 |
| | | | | 15/53.2 |
| 3,939,517 A * | 2/1976 | Bivens | ..................... | B60S 3/066 |
| | | | | 15/53.2 |
| 11,173,880 B2 * | 11/2021 | Dietsch | ..................... | B60S 3/04 |
| 2007/0151054 A1* | 7/2007 | MacNeil | ................... | B60S 3/06 |
| | | | | 15/53.1 |
| 2007/0174981 A1* | 8/2007 | Smith | ........................ | B60S 3/06 |
| | | | | 15/53.2 |

FOREIGN PATENT DOCUMENTS

| | | |
|---|---|---|
| DE | 20202632 U1 | 5/2002 |
| DE | 20204586 U1 | 9/2003 |
| DE | 102010060878 A1 | 5/2012 |

\* cited by examiner

*Primary Examiner* — Duy Vu N Deo
*Assistant Examiner* — Christopher Remavege
(74) *Attorney, Agent, or Firm* — The Webb Law Firm

(57) ABSTRACT

A method and safety device for a vehicle wash tunnel with a support structure with two parallel rails for the placement, by means of corresponding carriages, of the arms of an arch which incorporates a horizontal brush capable of linear movement along the arms of the arch and the rails. The safety device includes a rotation shaft, for fastening the arms of the arch to the carriages, and an extendable cylinder, spaced from the rotation shaft, which joins each carriage to the corresponding arch, such that the arch can rotate with respect to the carriages, and the extension of the extendable cylinder causes the rotation of the arch.

4 Claims, 5 Drawing Sheets

SAFETY DEVICE FOR VEHICLE WASH TUNNEL AND METHOD OF OPERATION

CROSS-REFERENCE TO RELATED APPLICATION

This application claims priority to Spanish Patent Application No. P202030447 filed May 14, 2020, the disclosure of which is hereby incorporated by reference in its entirety.

BACKGROUND OF THE INVENTION

Field of the Invention

The present invention, as expressed in the title of this specification, relates to a safety device for vehicle wash tunnels wherein it is the vehicle that moves, dragged by a chain system through the different washing or drying modules.

The invention also relates to the method of operation of the safety device.

This type of wash tunnel or machine is characterized in that it is narrow and cumbersome, in addition to the fact that the machine itself is what drags the vehicle. These conditions can create panic scenarios for the driver of the vehicle causing them to act irrationally inside the machine, which can cause damage thereto, their own vehicle or even themselves.

To do so, a washing method and device has been provided by means of which the brushes which perform the horizontal scrubbing (both washing and polishing) can be quickly cancelled in case the machine or the operator detects an anomaly with respect to the original operation, leaving the lane free for the passage of vehicles and preventing major incidents.

Description of Related Art

As a general rule, the wash tunnels for vehicles are made up of different modules, both for washing and polishing. The most conventional arrangement is divided into two areas. In the first work area there are one or more modules which contain brushes in a vertical position and in a horizontal position, which scrub the side and top dirt respectively, and also the front and rear portions of the vehicle, using water and chemical products. The drying area is located in a second area, which can have a fan drying system and be complemented by a system of brushes which help eliminate the last drops of water and polish the surfaces. The conveyor chain is a common connection between both areas, which is responsible for moving the vehicle in an uninterrupted manner throughout the two work areas.

Currently, two different systems are used which enable the movement of the horizontal brushes, both for washing and polishing. On the one hand, there are the systems wherein the brush moves linearly in the X and Z axes, according to the direction of the movement of the vehicle and vertically, respectively. An example of these systems is described in patent DE20204586U1, wherein a device is disclosed wherein the horizontal brush performs a movement in the longitudinal direction of the car, accompanied by a transverse movement by means of which it adjusts to the height of the profile of the vehicle. The advantage of these systems is that they enable the vehicle to be monitored while it is going through the washing or drying area, obtaining an optimal and detailed scrubbing, being the only manner to be able to touch the front and the rear during the movement of the vehicle. However, they have the disadvantage that, in the event of an anomaly in the operation, the brush can block the washing path as if it were a barrier, making it necessary to stop the entire machine and notify a specialist technician in order to resolve the anomaly.

On the other hand, there are systems wherein the brush adjusts to the height of the vehicle by means of a pendular movement. The brush is fixed at the end of an arm which pivots between zero and ninety degrees in favor of the movement of the vehicle, although without actually scrubbing the rear portion. In these systems, the brush is located on arms anchored to a point of a fixed structure. These arms pivot, setting the anchoring point as the center of rotation by means of an actuation or a counterweight, enabling the shaft of the brush to perform an angular movement depending on the height of the vehicle. An example of these systems is described in patent DE102010060878A1. The advantage of these systems is that they have simpler mechanisms for which reason the possibility of a breakdown is lower. They also enable the brush to be moved aside in case the vehicle exerts a force thereon. However, they have the disadvantage that they do not enable the tracking of the vehicle in order to wash the rear portion. For these cases there are other more complex systems, which combine two points of articulation such as those described in patents DE20202632U1 and U.S. Pat. No. 3,501,794A, wherein they enable an additional degree of freedom in order to reach the final portion of the vehicle. As a general drawback in this type of mechanism, the lack of control in movement is highlighted, and consequently a less detailed scrubbing. These latter mechanisms, although they are simpler than those described in the previous paragraph, also have the drawback that, in the case of the actuation which enables angular movement breaking, the lane would be blocked.

Therefore, the selection of one of the solutions which are currently in the state of the art entails a clear drawback, having to choose between having greater control in the process, by means of systems which move in Cartesian coordinates, or choosing the possibility of the brush pivoting from the pressure of the vehicle, by means of the solutions which use the pendular movement.

The present invention describes a device by means of which the drawbacks of the two current technologies are solved and enabling a system of brushes with linear movement, which can reach all the points of the vehicle, with the incorporation of a brush which can pivot, providing the safety which is sought.

SUMMARY OF THE INVENTION

In order to achieve the objectives and prevent the drawbacks mentioned in the previous sections, the invention proposes a method and a safety device for vehicle wash machines of the wash tunnel type, which enables working with the horizontal brush in Cartesian and polar coordinates together depending on the conditions it is in. In this manner, the advantages of each of the aforementioned solutions are combined in a single system.

When the proposed system is operating under normal conditions, the system of horizontal brushes works in Cartesian coordinates. In other words, the horizontal brush runs along the arch supporting it, moving in the Z-axis, in a vertical direction, and the arch is moved by means of carriages which run along parallel longitudinal rails placed in the general structure, according to the direction of the movement of the vehicle and which define the X-axis. To work in these conditions, the vehicle must be dragged by a chain envisaged to do so, maintaining the constant speed the wash tunnel is configured for.

The usual automatic method for carrying out the scrubbing of the vehicle by means of the horizontal brush under normal working conditions is as follows:

Rest position of the machine. The horizontal brush is located at the lower end of the Z-axis waiting for the vehicle to approach.

Approach of the vehicle towards the horizontal brush in the X-axis of the machine, and start of the rotational movement of the brush, until it contacts a lower portion of the front of the vehicle.

Movement in the Z-axis of the brush along the arch supporting it in order to copy the height of the vehicle and simultaneously, depending on the speed of the vehicle, movement of the carriage supporting the arch of the horizontal brush, performing tracking of the vehicle in order to scrub the vehicle correctly.

Once all the longitudinal scrubbing is finished, simultaneous movement of the carriage and the brush until they reach the initial rest position in order to receive the next vehicle.

There is a variant of operation when the machine stops completely or the next passing vehicle should not use the horizontal brush. In this case, the rest position of the machine maintains the brush in the upper position of the arch.

However, when the machine detects an anomaly in the normal operation, a safety system is activated which enables the circulation lane of the vehicle to be freed.

These anomalies can be as follows:

The vehicle exceeds the dragging speed of the chain.

The brush detects an overpressure exerted by the vehicle.

The arch detects an excess of inclination caused by the vehicle.

The system detects that the brush has not returned to the initial position thereof, blocking the lane.

The operator detects that the brush has not returned to the initial position thereof, blocking the lane.

When the machine or the operator detects these anomalies, the system works differently, executing a safety routine. In this case, the arch through which the horizontal brush runs during the movement in the Z-axis, moves angularly by means of the actuation of an extendable cylinder, having the joint with the carriage for movement in the X-axis as the center of rotation. In this manner, the horizontal brush is quickly and automatically moved aside to a position which leaves the lane completely free. Once the arch is angularly moved until the lane is freed, there is the possibility that a mechanical device may lock it in this second position, preventing the actuation from being forced until the failure is corrected. The extendable cylinders can be pneumatic or hydraulic.

The detection of the anomaly by the machine can be by means of sensors, usually pressure or photocells, which send a signal to a control center by means of which a solenoid valve is activated which enables the circulation of the corresponding fluid, either air or liquid, in order to put in motion the cylinder and, consequently, the arch. It must be taken into account that the fact that the extendable cylinders are active in transmitting the force to the arch is only an option, being able to be mere transmitters of the forces and that the arch is activated by a mechanism which acts directly on it.

BRIEF DESCRIPTION OF THE DRAWINGS

To complete the description of the invention, and for the purpose of helping to make the features thereof more readily understandable, according to a preferred exemplary embodiment thereof, a set of figures is included wherein, by way of illustration and not limitation, the following figures have been represented.

DESCRIPTION OF THE INVENTION

Figure 1:
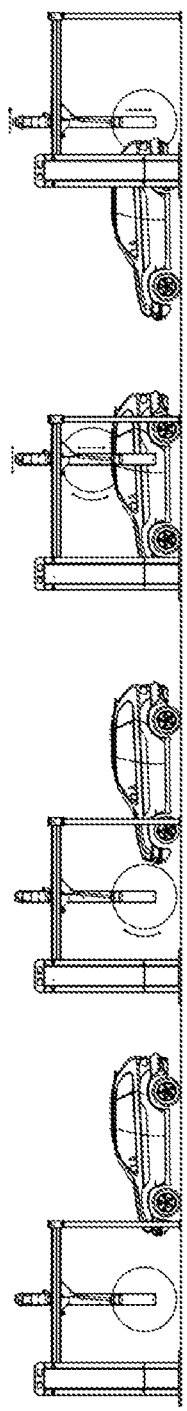
FIG. 1 shows side views during the operating process of a vehicle wash tunnel with technology of brushes with linear movement.

FIG. 1 represents the operating process of a vehicle wash tunnel with technology of brushes with linear movement. Four representative phases are represented in the figure:

Rest position of the machine, wherein the horizontal brush (7) is at the lower end of the Z-axis, awaiting the approach of the vehicle to be washed;

Approach of the vehicle towards the horizontal brush (7), and start of the rotational movement of the brush (7), until it contacts a lower portion of the front of the vehicle;

Vertical movement of the brush (7) along the arch (5) supporting it in order to copy the height of the vehicle and simultaneously, depending on the speed of the vehicle, movement of the carriage (4) supporting the arch (5) of the horizontal brush (7) according to the direction of the vehicle, performing tracking of the vehicle in order to scrub the vehicle correctly; and Displacement of the carriage (4) with the brush (7), once all the longitudinal scrubbing of the vehicle is finished, until they reach the initial rest position in order to receive the next vehicle.

Figure 2:
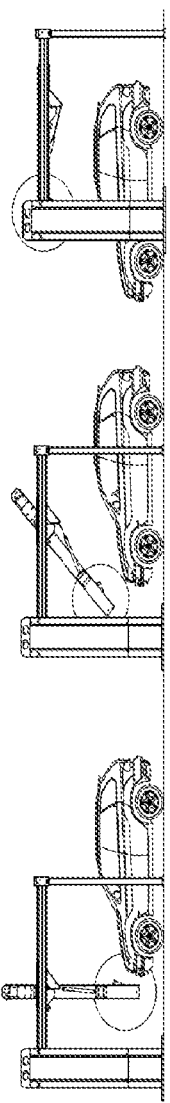
FIG. 2 represents the operating process of a vehicle wash tunnel with the safety device of the invention when detecting an emergency situation.

FIG. 2 represents the operating process of a vehicle wash tunnel with the safety device of the invention when detecting an emergency situation wherein the rotation of the arch (5) of the horizontal brush (7) to a certain angle is required in order to free the lane through which the vehicle moves:

The system detects an anomalous operation, such as excessive pressure in the brush (7) or a speed of the vehicle above the speed of the dragging chain.

The safety procedure is started by proceeding to the angular movement of the arch (5) of the horizontal brush (7).

The arch (5) reaches the suitable position to free the lane through which the vehicle runs and the position thereof is locked by means of a mechanical locking device.

The safety device with all the elements and functionalities thereof and the safety method of the wash tunnel are described in detail below.

Figure 3:
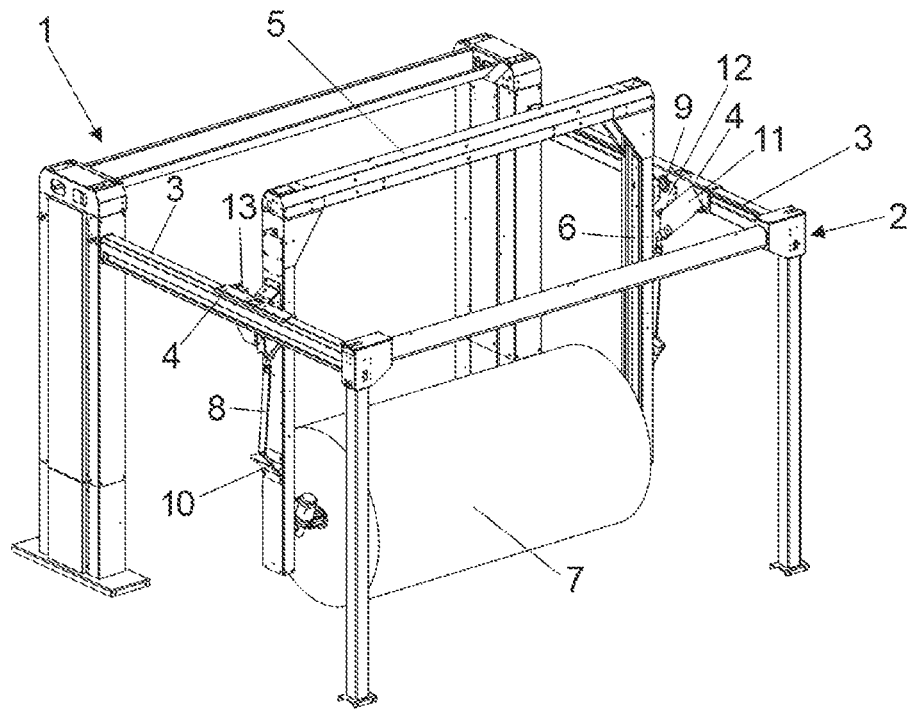
FIG. 3 shows a perspective view of the washing machine with the device of the invention in normal working conditions.
Figure 4:
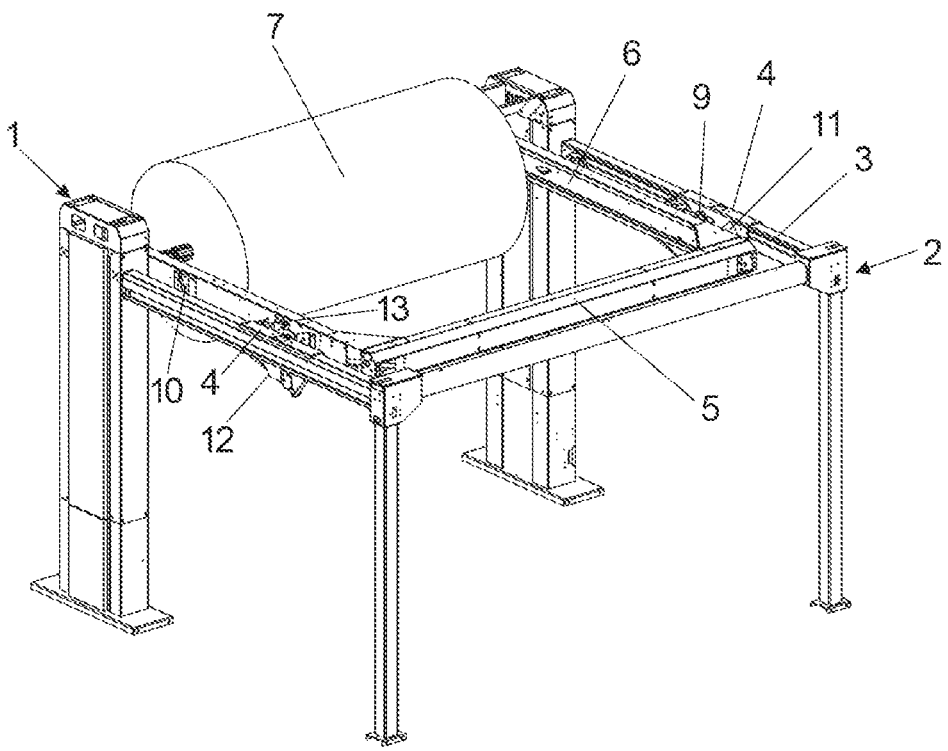
FIG. 4 shows a perspective view of the washing machine with the device of the invention in emergency conditions in order to free the lane through which the vehicle runs.

As represented in FIGS. 3 and 4, the wash tunnel comprises a support structure basically formed by a rear structure (1) and a front structure (2) joined by rails (3) to which carriages (4) are fastened, which can move along the rails (3) in a synchronized manner.

The rails (3) define the X-axis of movement of the carriages (4), which is the same as the axis of the direction of movement of the vehicle to be washed. On the other hand, the Z-axis defines the vertical and the Y-axis defines the remaining transverse direction of the three-dimensional orthogonal system.

It must be considered that the structure is symmetric with respect to the XZ plane which passes through the center of the structures (1, 2).

The wash tunnel also incorporates an arch (5) for fastening the horizontal brush (7). The arch (5) is formed by a crossbar and two parallel arms by means of which it is joined to the rails (3) through the carriages (4).

The carriage (4) incorporates a rotation shaft (9) to which the corresponding arm of the arch (5) is joined.

In this manner, the arch (5) moves jointly with the carriages (4) and, therefore, can move in the same direction as the vehicle, while it can also rotate with respect to the carriages (4).

Each of the ends of the shaft of the horizontal brush (7) is joined to a guide (6) which is housed in each of the arms of the arch (5).

These guides (6) are responsible for guiding the movement of the brush (7) along the Z-axis, copying the height of the vehicle during normal operating conditions.

When, either through the machine, by means of sensors, for example, or by an operator, an anomaly is detected, the safety device of the invention is activated, which enables the arch (5) to move angularly, together with the brush (7), from the vertical position shown in FIG. 3, to the horizontal position shown in FIG. 4, freeing the lane through which the vehicle runs.

The mechanism by which the detection of anomalies is received and the activation device of the safety device are known in the state of the art and do not form part of the invention, therefore they have not been described or represented in the figures.

The safety device comprises an upper support (11) integral with each of the carriages (4) and, optionally, a counter support (12) with the aim of providing stiffness to the device, also integral with each carriage (4). Furthermore, it also comprises a lower support (10) integral with each of the arms of the arch (5).

Figure 5:
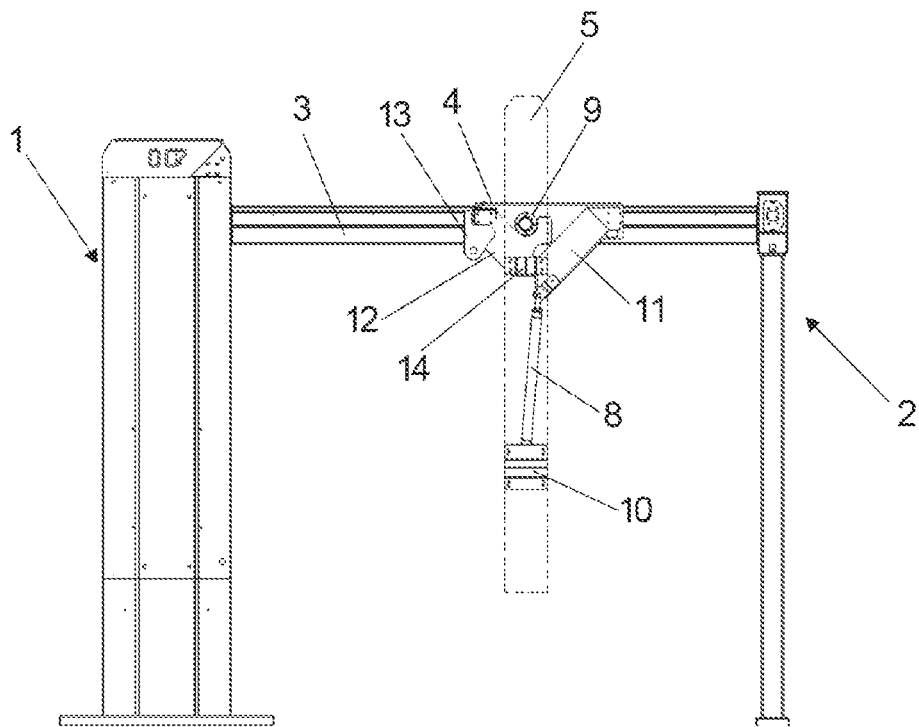
FIG. 5 shows a side view of the washing machine, showing the elements of the device of the invention which enable the angular movement of the horizontal brush in the initial position of the emergency operation.
Figure 6:
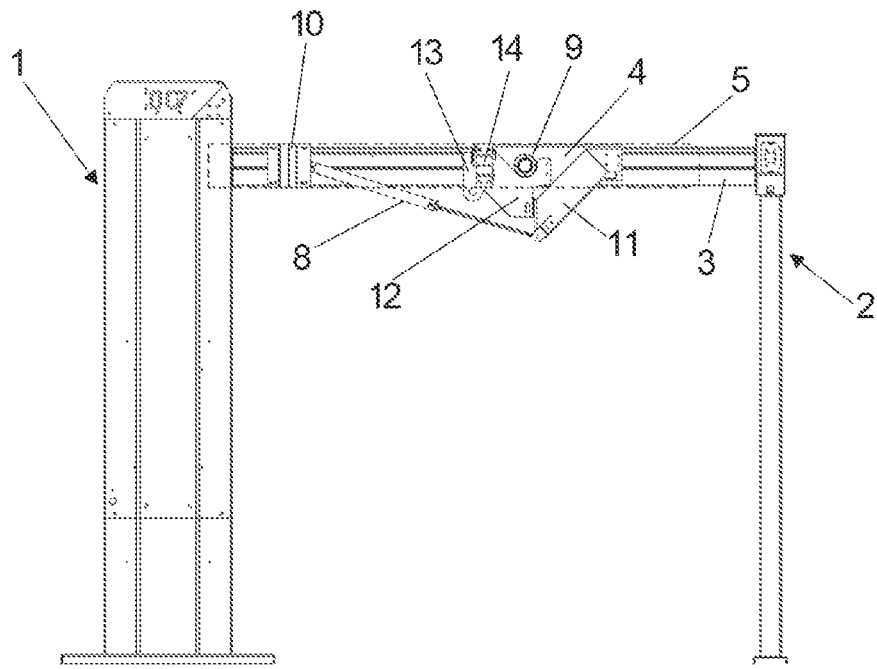
FIG. 6 shows a side view of the washing machine, showing the elements of the device of the invention which enable the angular movement of the horizontal brush in the final position of the emergency operation.
Figure 7A:
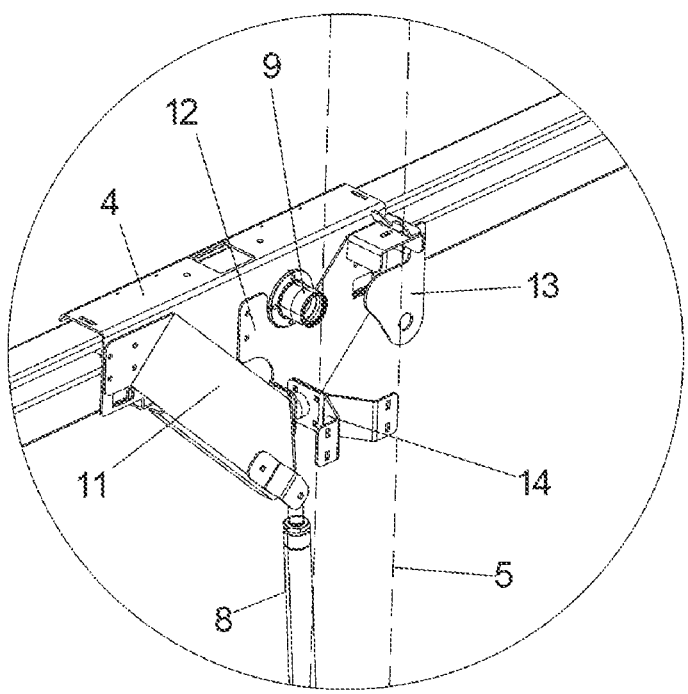
FIG. 7a shows a perspective view of the detail of the locking system of the invention with the arch of the brush in the conventional operating position.
Figure 7B:
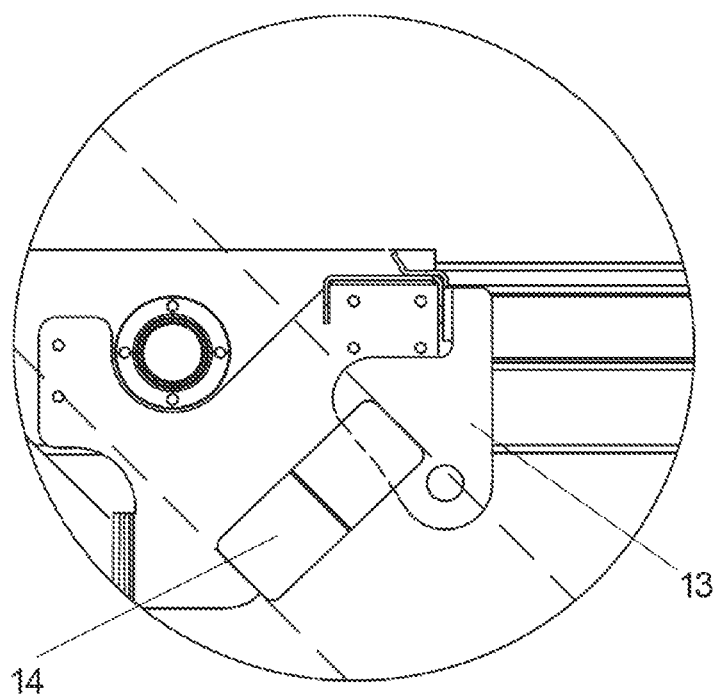
FIG. 7b shows a detail view of the locking system of the invention starting to perform the angular movement.
Figure 7C:
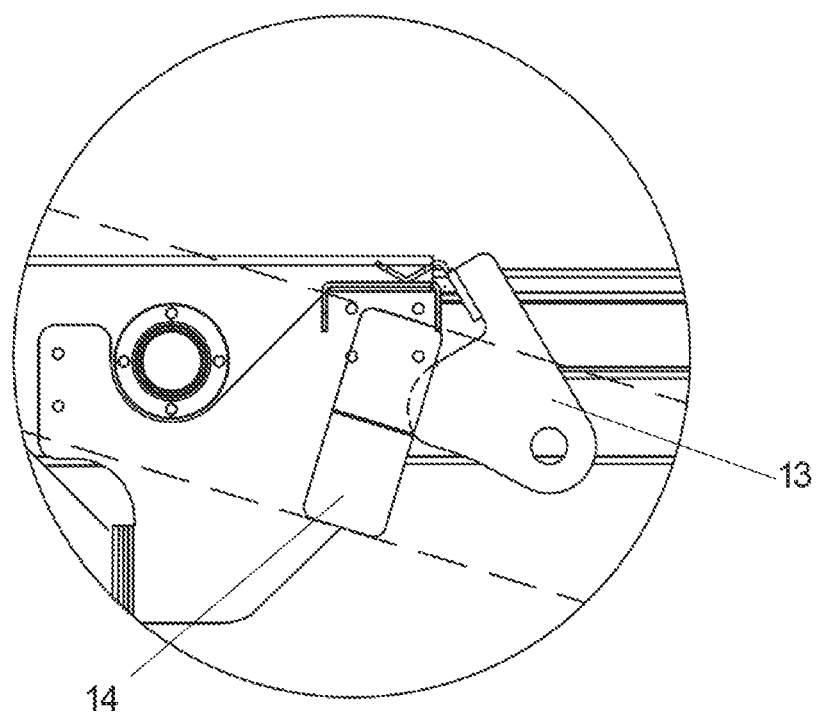
FIG. 7c shows a detail view of the locking system of the invention with the interlocking support pushing to make the locking hook rotate.
Figure 7D:
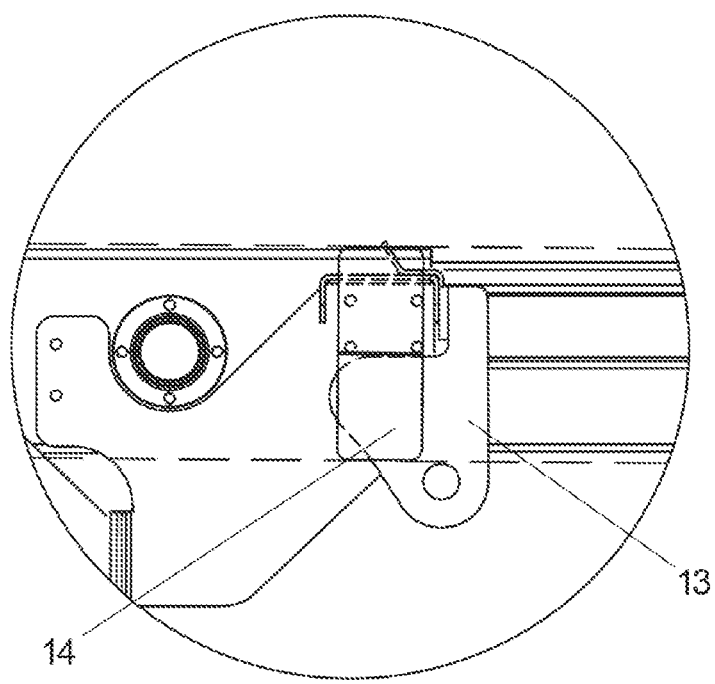
FIG. 7d shows a detail view of the locking system of the invention once the interlocking support has surpassed the locking hook, which returns to the initial position locking the angular position of the arch of the brush.

The supports (10, 11) are intended to fasten, with the possibility of rotation, the ends of an extendable cylinder (8) by means of which the movement of the safety device is carried out from a normal situation with the arch (5) being vertical, as shown in FIG. 5, to an emergency situation, with the arch (5) in an elevated position, as shown in FIG. 6. The extendable cylinder (8) can be extended in order to increase the distance between the upper support (11) and the lower support (10), causing the angular movement of the arch (5) around the rotation shaft (9), until it reaches the appropriate angle corresponding to an elevation of the horizontal brush (7) wherein it enables the movement of the vehicle through the lane of the wash tunnel and does not interfere with it. Typically this situation is that of the XY plane, in other words, with the arch (5) in the horizontal position.

The rotational capacity of the extendable cylinder (8) with respect to the supports (10, 11) is fundamental, such that the different positions can be absorbed during the rotational movement.

Once the arch (5) reaches the final position for freeing the lane, a locking mechanism acts which enables the arch (5) to be maintained in this final elevated position. The locking mechanism is made up of a locking hook (13), joined to the carriage (4), for example, through the counter support (12), at a point whereon it has the possibility of tilting, and an interlocking support (14), integral with the arch (5), the locking mechanism operating like a ratchet.

In this manner, in the rotational movement of the arch (5), the interlocking support (14) moves together with the arch (5) which, when it contacts the locking hook (13), it starts to push it, making it rotate. In this manner, the locking hook (13) starts to be inclined, pushed by the interlocking support (14) until it reaches the maximum inclination position wherein the interlocking support (14) surpasses the locking hook (13), which returns to the initial position, locking the interlocking support (14) and maintaining the arch (5) in the elevated position wherein the lane is free.

As shown in FIGS. 7a-7d the locking system (13) can only be freed intentionally by means of the operation on the locking hook (13), such that it is inclined in order to free the interlocking support (14).

The safety method for a vehicle wash tunnel, by means of the safety device described, once an operating anomaly has been detected in the wash tunnel, comprises the following phase:

Extending the extendable cylinder (8) in order to elevate the arch (5) with the horizontal brush (7) to a certain height.

Furthermore, it can also comprise the following phase:

Maintaining the arch (5) retained in height by means of a locking device.

It must be taken into account that the unlocking of the arch (5) can only be produced intentionally.

The invention claimed is:

1. A safety device for a vehicle wash tunnel comprising:
a support structure with two parallel rails for the placement by means of corresponding carriages of the arms of an arch which incorporates a horizontal brush for washing the vehicle, capable of linear movement along the arms of the arch and the rails,
a rotation shaft integral with each carriage for fastening each arm of the corresponding arch; and
an extendable cylinder spaced from each rotation shaft which joins each carriage to the arch by means of supports whereon it can rotate, wherein the arch is capable of rotating with respect to the carriages and the extension of the extendable cylinder causes the rotation of the arch and a locking device further comprising:
a locking hook integral with one carriage, capable of tilting; and
an interlocking support integral with the arch;
wherein the rotation of the arch causes the contact of the interlocking support with the locking hook, which tilts until it reaches a limit position wherein it loses contact with the interlocking support in order to move on to lock it and, with it, the movement of the arch, which is retained.

2. A safety method for a vehicle wash tunnel, by means of the safety device of claim 1, wherein once an operating anomaly has been detected in the wash tunnel, the method includes:
   extending the extendable cylinder in order to elevate the arch with the horizontal brush to a certain height.

3. The safety method for a wash tunnel, according to claim 2, further including:
   maintaining the arch in the elevated position by the locking device.

4. The safety method for a wash tunnel, according to claim 3, wherein unlocking of the arch is produced intentionally.

\* \* \* \* \*